United States Patent
Hsieh

[11] Patent Number: 5,911,154
[45] Date of Patent: Jun. 8, 1999

[54] WRENCH TORQUE VALUE CALIBRATING APPARATUS

[76] Inventor: Chih-Ching Hsieh, No. 64, Lane 107, Liang Tsun Rd., Fong Yuan City, Taichung Hsien, Taiwan

[21] Appl. No.: 08/961,250

[22] Filed: Oct. 30, 1997

[51] Int. Cl.⁶ .................................................. G01C 17/38
[52] U.S. Cl. .......................................................... 73/1.12
[58] Field of Search ........................... 73/1.09, 1.11, 73/1.12, 862.08, 862.191, 862.321

[56] References Cited

U.S. PATENT DOCUMENTS 3,364,725  1/1968  Grabovac .................................. 73/1.12
3,979,942  9/1976  Grabovac .................................. 73/1.12

FOREIGN PATENT DOCUMENTS 000591728  2/1978  U.S.S.R. .................................. 73/1.12

*Primary Examiner*—Robert Raevis
*Attorney, Agent, or Firm*—Varndell Legal Group

[57] ABSTRACT

A wrench torque value callibrating apparatus having a flexible main rod coupled to an actuating member, and a torque meter with a probe disposed in contact with the flexible main rod for measuring the torque value of the wrench to be calibrated, wherein two flexible auxiliary rods are coupled to the actuating member in parallel to the flexible main rod for fine calibration adjustment.

3 Claims, 5 Drawing Sheets

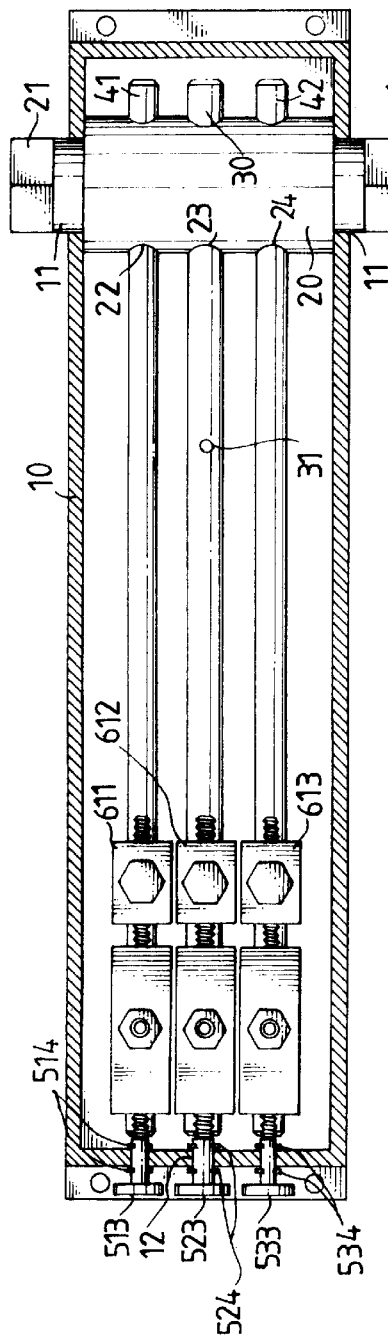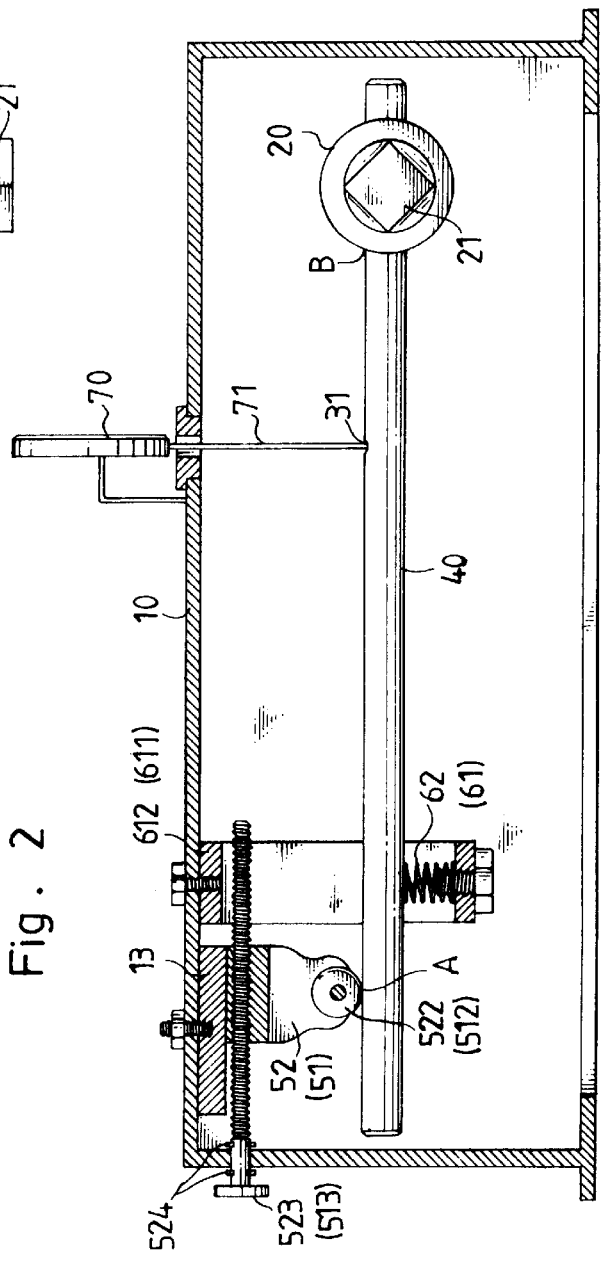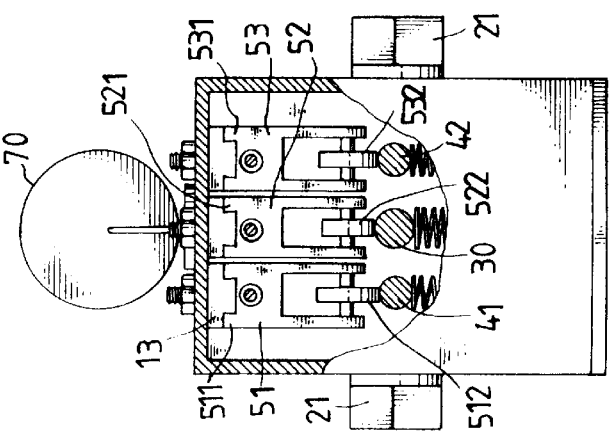

WRENCH TORQUE VALUE CALIBRATING APPARATUS

BACKGROUND AND SUMMARY OF THE INVENTION

The present invention relates to a wrench torque value calibrating apparatus, and more particularly to such a wrench torque value calibrating apparatus which is durable and precise, and practical for fine calibration adjustment.

The torque value of a torque wrench must be precisely calibrated, so as to prevent a damage to the workpiece. FIG. 1 shows a wrench torque value calibrating apparatus according to the prior art. This structure of wrench torque value calibrating apparatus comprises a casing having a fixed block longitudinally disposed on a bottom wall of a top side thereof, an actuating member revolvably supported on the casing and having two polygonal end blocks at two opposite ends respectively extended out of two opposite lateral sides of the casing for turning with the torque wrench to be calibrated, a sliding block coupled to the fixed block and moved longitudinally along it, a flexible main rod having a first end perpendicularly connected to the actuating member and a second end stopped below the sliding block, and a torque meter mounted on the casing and having a probe perpendicularly disposed in contact with the flexible main rod. The flexible main rod is bent in one direction to lift the probe when the actuating member is turned with the wrench to be calibrated, thereby causing the torque meter to show the set torque value of the wrench to be calibrated. This structure of wrench torque value calibrating apparatus is not a high presicion calibrating instrument because it has no means for fine calibration adjustment. Another drawback of this structure of wrench torque value calibrating apparatus is its short service lile because the flexible main rod wears quickly with use.

The present invention has been accomplished to provide a wrench torque value calibrating apparatus which eliminates the aforesaid drawbacks. It is one object of the present invention to provide a wrench torque value calibrating apparatus which is practical for a fine calibration adjustment to achieve high precision. It is another object of the present invention to provide a wrench torque value calibrating apparatus which is durable in use. According to one aspect of the present invention, the wrench torque value calibrating apparatus comprises a casing having a fixed block longitudinally disposed on a bottom wall of its top side, an actuating member revolvably supported on the casing and having at least one polygonal end block extended out of the casing for turning with the torque wrench to be calibrated, a sliding block coupled to the fixed block of the casing and moved longitudinally along it, the sliding block having a top side coupled to the fixed block and a bottom side mounted with a roller, a flexible main rod having a first end perpendicularly connected to the actuating member and a second end stopped below the roller of the sliding block, and a torque meter mounted on the casing and having a probe perpendicularly disposed in contact with the flexible main rod, the flexible main rod being bent in one direction to lift the probe when the actuating member is turned with the wrench to be calibrated, causing the torque meter to show the set torque value of the wrench to be calibrated, wherein at least one auxiliary fixed block is longitudinally mounted inside the casing; at least one auxiliary sliding block is respectively coupled to the at least one auxiliary fixed block inside the casing, each of the at least one auxiliary sliding block having a top side coupled to the corresponding auxiliary fixed block and a bottom side mounted with a roller; at least one adjustment screw rod is mounted in a respective hole on the casing and respectively connected to the at least one auxiliary sliding block by a screw joint, the at least one adjustment screw rod being turned to move the at least one auxiliary sliding block along the at least one auxiliary fixed block respectively; and at least one flexible auxiliary rod is mounted inside the casing in parallel to the flexible main rod and coupled to the actuating member, the at least one flexible auxiliary rod having a greater flexibility than the flexible main rod, each of the at least one flexible auxiliary rod having a first end perpendicularly connected to the actuating member and a second end stopped below the roller of one auxiliary sliding block. According to another aspect of the present invention spring members are respectively mounted inside the casing to impart an upward pressure to the second ends of the flexible main rod and the at least one flexible auxiliary rod. According to still another aspect of the present invention, at least one spring holder is mounted inside the casing below the at least one flexible auxiliary rod, and at least one heavy-duty spring is respectively coupled between the at least one spring holder and the at least one flexible auxiliary rod and moved between the at least one auxiliary sliding block and the probe of said torque meter, the at least one heavy-duty spring imparting a downward pressure to the second end of each of the at least one flexible auxiliary rod.

BRIEF DESCRIPTION OF THE DRAWINGS

FIG. 2 is a top view in section of a wrench torque value calibrating apparatus according to the present invention.

FIG. 3 is a longitudinal view in section of the wrench torque value calibrating apparatus shown in FIG. 2.

FIG. 4 is a transverse view in section of the wrench torque value calibrating apparatus shown in FIG. 2.

DETAILED DESCRIPTION OF THE PREFERRED EMBODIMENT

Figure 1:
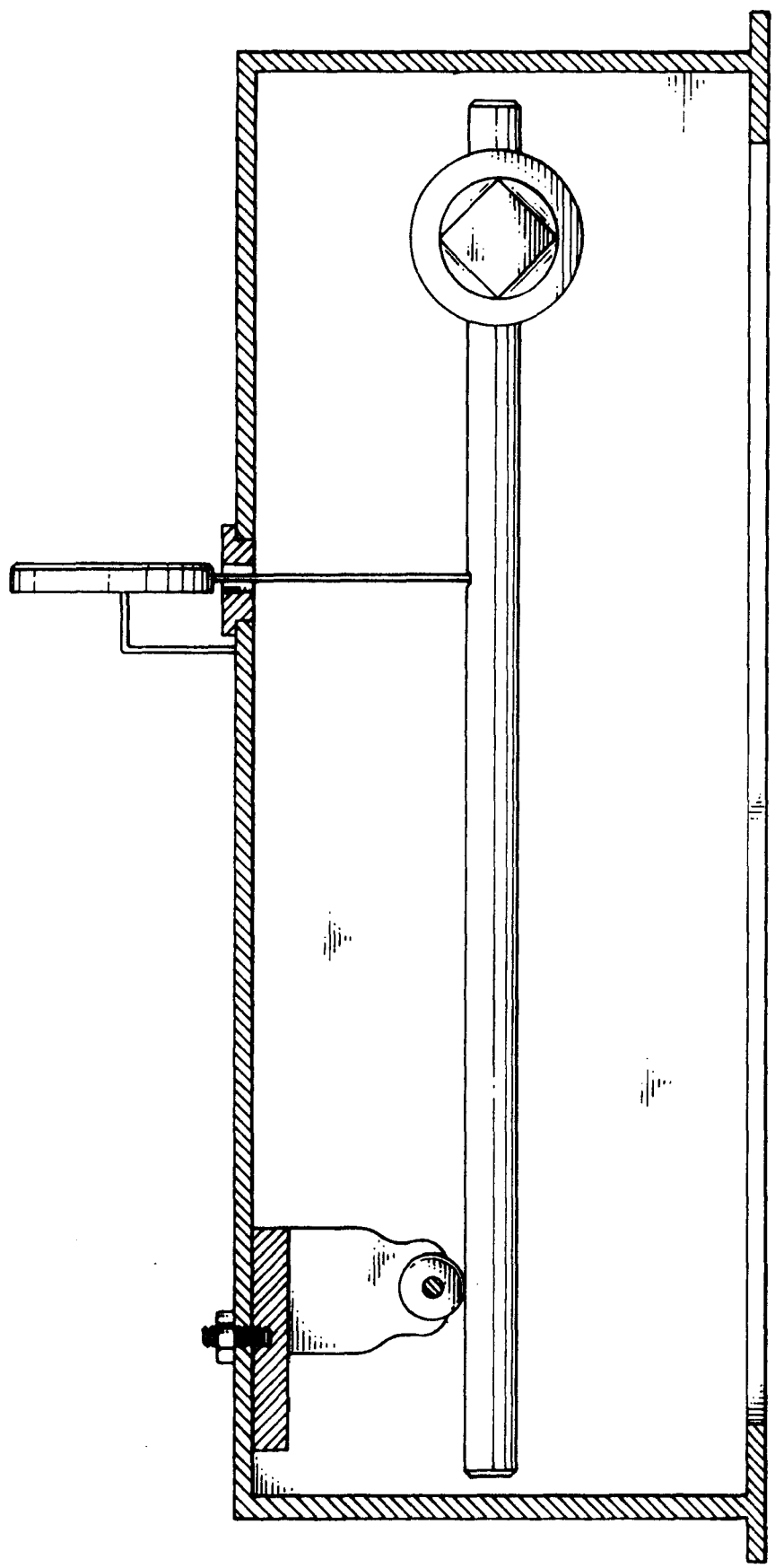
FIG. 1 is a sectional view of a wrench torque value calibrating apparatus according to the prior art.

Referring to FIGS. 2, 3 and 4, an apparatus for calibrating the torque value of a torque wrench is shown comprised of a casing 10, an actuating member 20, a flexible main rod 30, two flexible auxiliary rods 41; 42, three sliding blocks 51; 52; 53, three spring members 61; 62; 63, and a torque meter 70.

The casing 20 is a rectangular, bottom-open shell having two big circular holes 11 bilaterally disposed near its front side, three small circular holes 12 horizontally spaced at its rear side, and three longitudinal dovetail blocks 13 fixedly and longitudinally mounted on the bottom wall of its top side near its rear side corresponding to the small circular holes 12.

The actuating member 20 is a cylindrical member transversely suspended in the casing 10, having two polygonal end blocks 21 respectively extended out of the big circular holes 11 of the casing 10, and three transverse through holes 22; 23; 24 respectively disposed in alignment with the small circular holes 12 on the casing 10. The two through holes 22; 24 at two opposite sides are relatively smaller than the through hole 23 in the middle.

The main rod 30 is a cylindrical rod inserted with its one end into one through hole 23 of the actuating member 20, having a flat key way 31 near its middle part.

The auxiliary rods 41; 42 are cylindrical rods respectively inserted into the through holes 22; 24 of the actuating member 20 at two opposite sides of the main rod 30, having an equal diameter relatively smaller than the main rod 30.

The sliding blocks 51; 52; 53 have a respective dovetail groove 511; 521; 531 at the top respectively coupled to the longitudinal dovetail blocks 13 inside the casing 10, a respective roller 512; 522; 532 at the bottom respectively disposed in contact with the rods 41; 30; 42, and a respective screw hole (not shown). Three adjustment screw rods 513; 523; 533 are respectively mounted in the small circular holes 12 on the rear side of the casing 10, and threaded into the screw holes on the sliding blocks 51; 52; 53. C-shaped clamps 514; 524; 534 are respectively fastened to the adjustment screw rods 513; 523; 533 outside the casign 10 to hold the adjustment screw rods 513; 523; 533 are turned clockwise/counter-clockwise, the sliding blocks 51; 52; 53 are forced to move along the rods 41; 30; 42 forwards/backwards, and therefore the distance between the bearing point A (the contact point between the roller 512; 522; 532 and the rods 41; 30; 42) and the bearing point B (the contact point between the rod 41; 30; 42 and the actuating member 20) is relatively adjusted.

The spring members 61; 62; 63 are respectively mounted on respective spring holders 611; 612; 613 inside the casing 10 between the actuating member 20 and the sliding blocks 51; 52; 53. The spring members 61; 62; 63 impart an upward pressure to the rods 41; 30; 42.

The torque meter 70 is mounted on the casing 10 on the outisde, having a probe 71 extended into the casing 10 and stopped at the flat key way 31 of the main rod 30.

Figure 5:
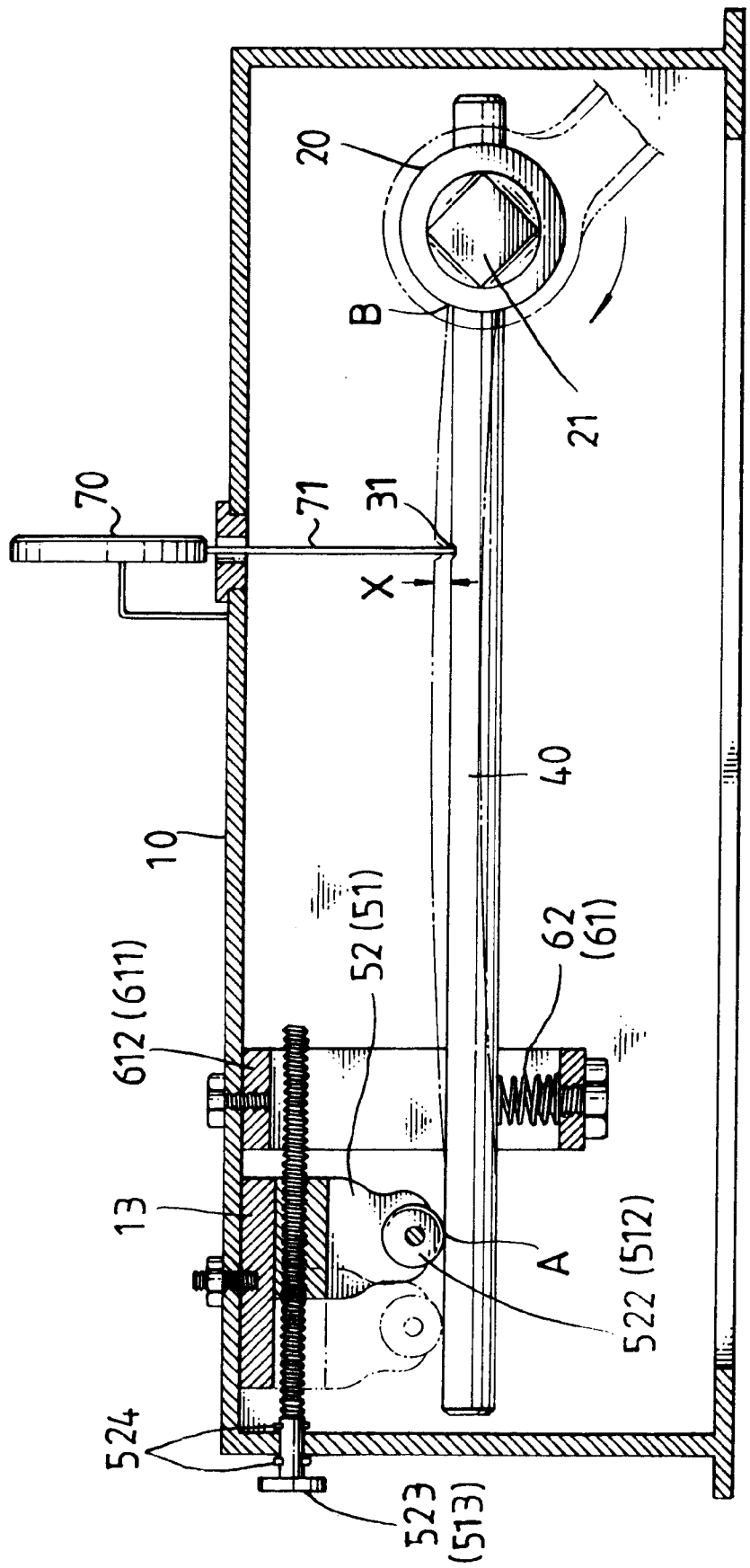
FIG. 5 is an applied view of the present invention, showing the actuating member turned with the torque wrench to be calibrated.

Referring to FIG. 5, when a torque wrench is attached to one polygonal end block 21 of the actuating member 20 and turned, a torsional force is transmitted from the torque wrench through the actuating member 20 to the main rod 30 and the auxiliary rods 41; 42, to curve upwards, and therefore the probe 71 is forced upwards at a distance X and the torque value is shown through the torque meter 70. Further, by means of turning the adjustment screw rod 523 to move the corresponding sliding block 52 along the corresponding dovetail block 13, the distance between the bearing point A and bearing point B on the main rod 30 is adjusted, and the curvature of the main rod 30 after bending is relatively changed. For a fine adjustment, the adjustment screws 513; 533 are turned to move the corresponding sliding blocks 51; 53 along the corresponding dovetail blocks 13 to adjust the distance between the bearing point A and bearing point B on the auxiliary rods 41; 42.

Figure 6:
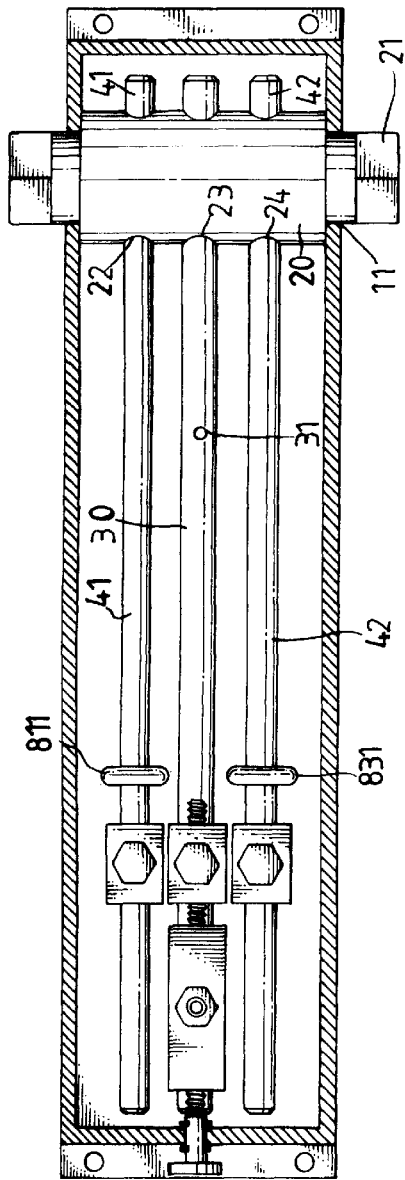
FIG. 6 is a top view in section of an alternate form of the wrench torque value calibrating apparatus according to the present invention.
Figure 7:
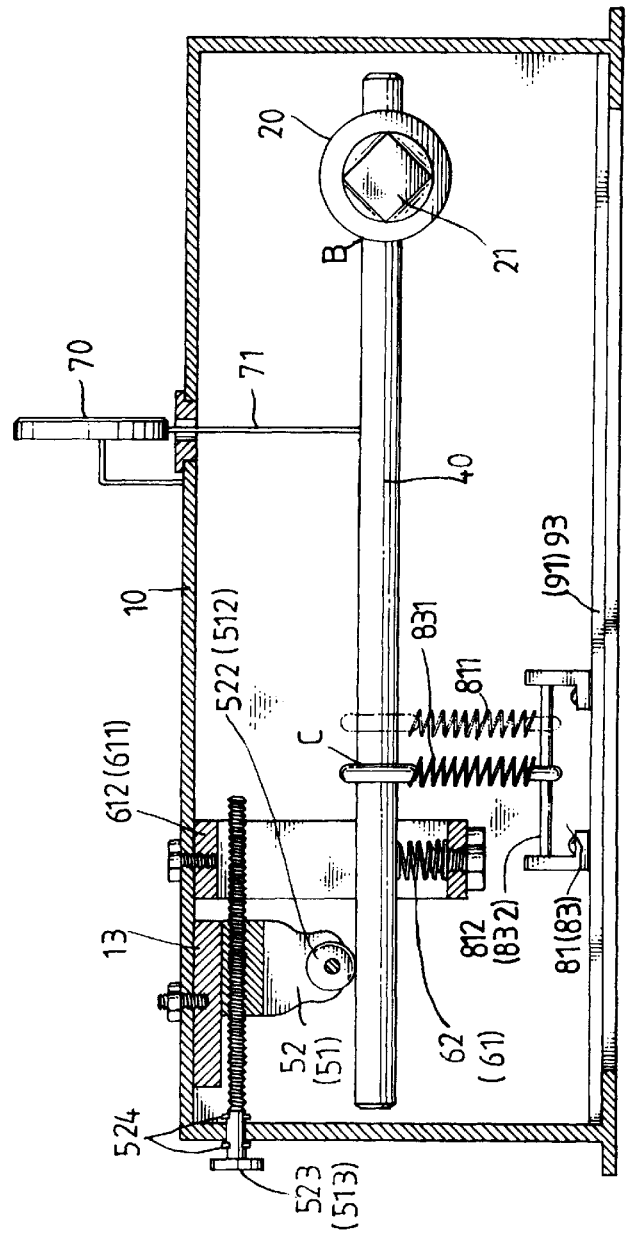
FIG. 7 is a side view in section of FIG. 6.
Figure 8:
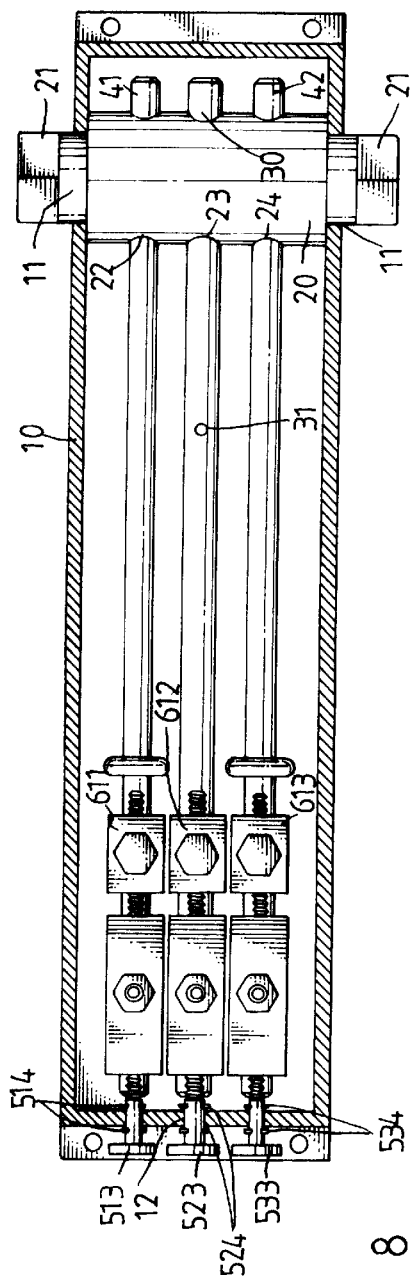
FIG. 8 is a top view in section of an alternate form of the wrench torque value calibrating apparatus according to the present invention.
Figure 9:
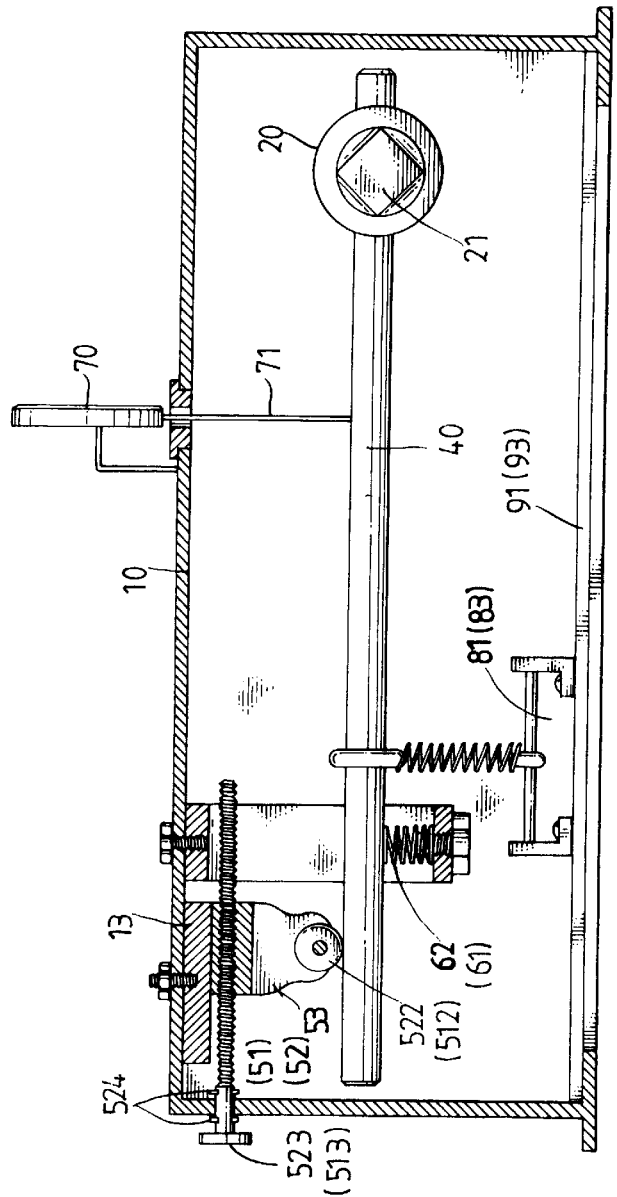
FIG. 9 is a side view in section of FIG. 8.

FIGS. 6 and 7 show an alternate form of the present invention, in which two spring holders 81; 83 are respectively mounted on two longitudinal locating rails 91; 93 inside the casing 10 at the bottom, and two heavy-duty springs 811; 831 are respectively coupled between horizontal rods 812; 832 of the spring holders 81; 83 and the auxiliary rods 41; 43. The heavy-duty springs 811; 831 can be moved along the horizontal rods 812; 832 to change the distance between the bearing point B (the contact point between the auxiliary rods 41; 42 and the actuating member 20) and the bearing point C (the contact point between the heavy-duty springs 811; 831 and the auxiliary rods 41; 42). When the actuating member 20 is turned with a wrench, the auxiliary rods 41; 42 are forced to curve upwards between the bearing point B and the bearing point C.

I claim:

1. A wrench torque value calibrating apparatus of the type comprising: a casing having a fixed block longitudinally disposed on a bottom wall of a top side thereof; an actuating member revolvably supported on said casing and having at least one polygonal end block extended out of said casing for turning with the torque wrench to be calibrated; a sliding block coupled to said fixed block of said casing and moved longitudinally along it, said sliding block having a top side coupled to said fixed block of said casing and a bottom side mounted with a roller; a flexible main rod having a first end perpendicularly connected to said actuating member and a second end stopped below the roller of said sliding block; and a torque meter mounted on said casing and having a probe perpendicularly disposed in contact with said flexible main rod, said flexible main rod being bent in one direction to lift said probe when said actuating member is turned with the wrench to be calibrated, causing said torque meter to show the set torque value of the wrench to be calibrated; wherein at least one auxiliary fixed block is longitudinally mounted inside said casing; at least one auxiliary sliding block is respectively coupled to said at least one auxiliary fixed block inside said casing, each of said at least one auxiliary sliding block having a top side coupled to the corresponding auxiliary fixed block and a bottom side mounted with a roller; at least one adjustment screw rod is mounted in a respective hole on said casing and respectively connected to said at least one auxiliary sliding block by a screw joint, said at least one adjustment screw rod being turned to move said at least one auxiliary sliding block along said at least one auxiliary fixed block respectively; and at least one flexible auxiliary rod is mounted inside said casing in parallel to said flexible main rod and coupled to said actuating member, said at least one flexible auxiliary rod having a greater flexibility than said flexible main rod, each of said at least one flexible auxiliary rod having a first end perpendicularly connected to said actuating member and a second end stopped below the roller of one auxiliary sliding block.

2. The wrench torque value calibrating apparatus of claim 1, wherein spring members are respectively mounted inside said casing to impart an upward pressure to the second ends of said flexible main rod and said at least one flexible auxiliary rod.

3. The wrench torque value calibrating apparatus of claim 1, wherein spring members are respectively mounted inside said casing below said at least one flexible auxiliary rod, and at least one heavy-duty spring is respectively coupled between at least one spring holder and said at least one flexible auxiliary rod, said at least one heavy-duty spring imparting a downward pressure to the second end of each of said at least one flexible auxiliary rod.

* * * * *